March 11, 1958 W. F. MUELLER 2,826,421
TRAILER-TANKER
Filed Aug. 2, 1954 3 Sheets-Sheet 1
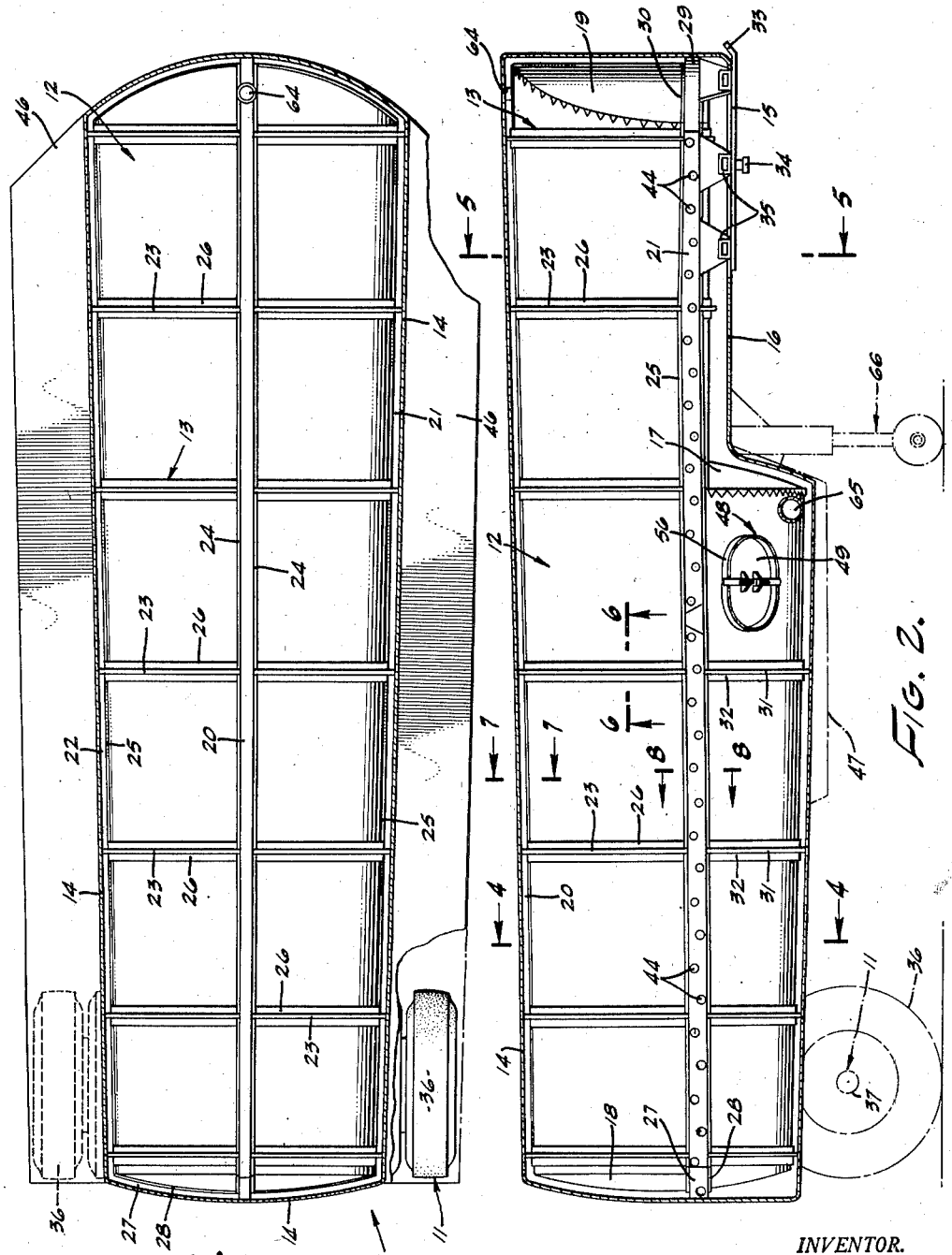
INVENTOR.
WILLIAM F. MUELLER

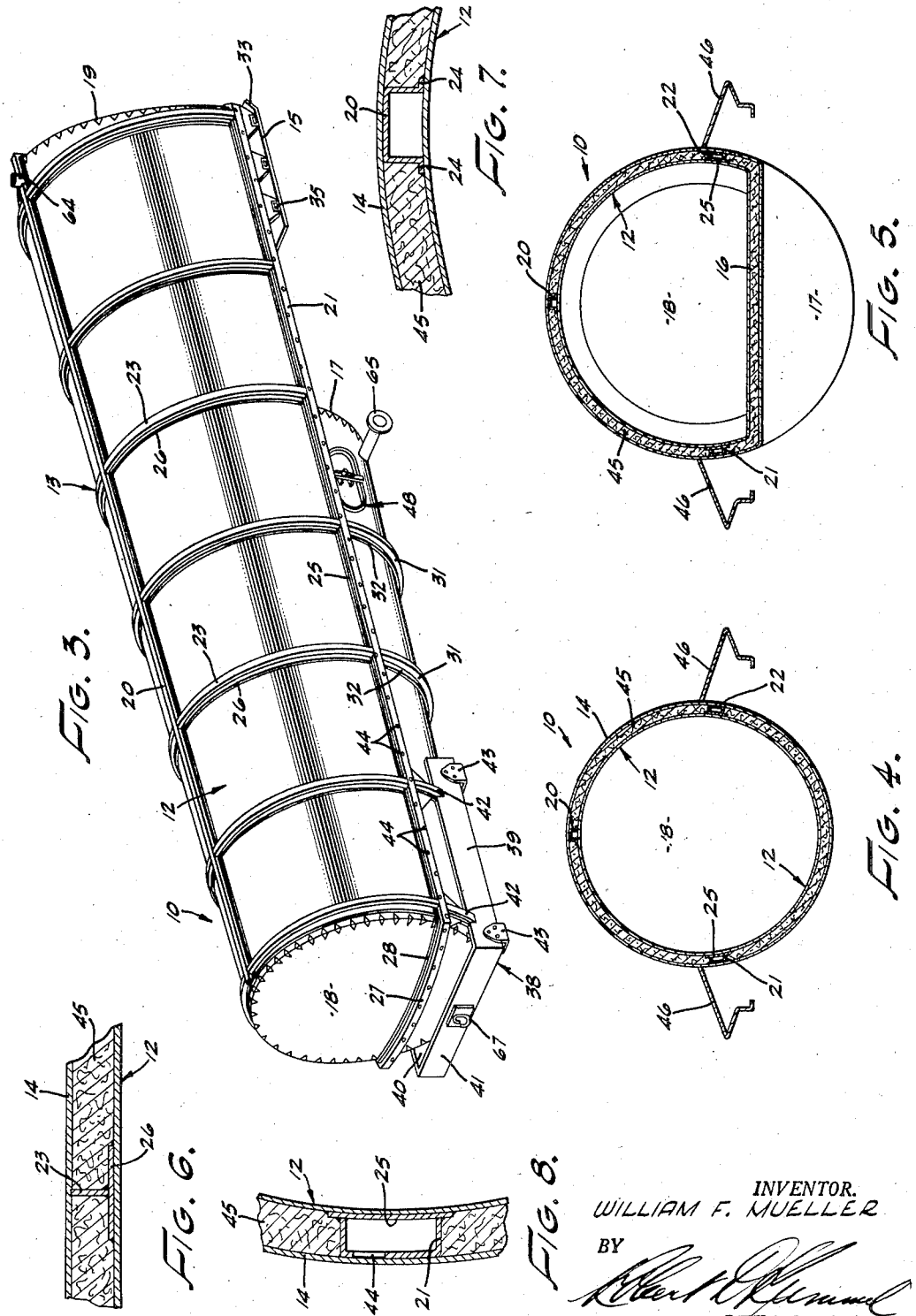

March 11, 1958 W. F. MUELLER 2,826,421
TRAILER-TANKER
Filed Aug. 2, 1954 3 Sheets-Sheet 3
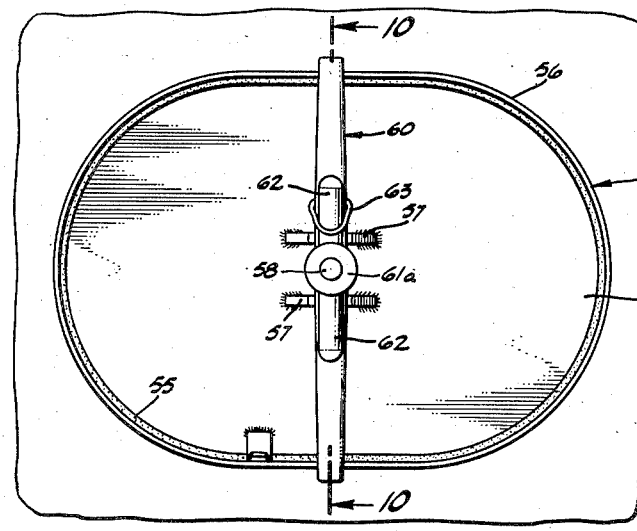
FIG. 9.
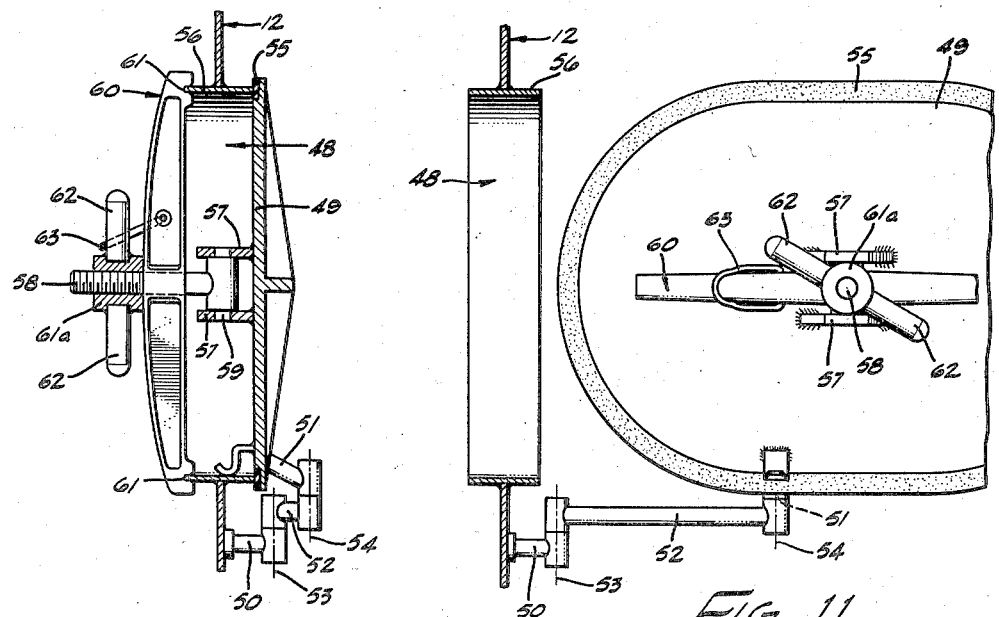
FIG. 10.  FIG. 11.
INVENTOR.
WILLIAM F. MUELLER
BY
ATTORNEY

United States Patent Office 2,826,421
Patented Mar. 11, 1958

2,826,421

TRAILER-TANKER

William F. Mueller, Van Nuys, Calif.

Application August 2, 1954, Serial No. 447,272

10 Claims. (Cl. 280—5)

The present invention relates to a trailer-tanker construction, and more specifically to the construction of a trailer-tanker of the type commonly used for the bulk transport of milk or similar fluids.

Trailer-tankers for the bulk transport of milk or other sanitary fluids must be constructed so as to conform to various sanitary rules and regulations and for this reason differ in certain very important structural respects from tanker constructions for use in the transport to fluids such as gasoline or other unsanitary fluids. For instance, tanks used in the transport of gasoline are usually reinforced from the inside by means of baffles or other suitable structural elements. However, tanks for the transport of milk for sanitary reasons cannot be strengthened in this manner from the inside. For this reason a tank for the transport of gasoline can be carried so that the undersurface thereof extends into the well formed between the wheels of its supporting trailer which positions the center of gravity of the tank sufficiently close to the highway to effect good riding and tracking characteristics. However, the tanks of milk trailers have hitherto not been supported so that the undersurface thereof extends into the well formed between the supporting wheels of the trailer so as to have a correspondingly low center of gravity but have rather been supported sufficiently above the wheels to effect poor riding and tracking characteristics because of the relatively high center of gravity. The typical milk trailer-tanker construction of the type presently in use employs a wheel supported frame on which is carried the tank which is generally oval in cross section. The tank is supported above the trailer in suitable supporting blocks or saddles which in turn are fixed rigidly to the trailer. The tank, besides being oval in cross section, is generally formed so that its width corresponds to the maximum legal width permitted by law for vehicles of this type.

The present invention contemplates a tanker construction wherein the tank is positioned so that the undersurface thereof extends into the well formed between the supporting wheels but in which the strength of the tank is not dependent upon inside reinforcing members such as baffles or the like. The trailer-tanker construction of the present invention consequently effects tracking and riding characteristics which are far superior to milk trailer-tanker constructions presently in use and which, because of the unique construction of the supporting frame and the tank itself, results in a greater pay load.

It is, therefore, a primary object of the present invention to generally improve the operation and construction of trailer-tankers of this type.

A further object of the present invention is to provide a unique supporting frame for supporting the receptacle or tank between the wheels of the trailer-tanker and sufficiently close to the highway to locate the center of gravity sufficiently low to effect good riding and tracking characteristics.

Another object of the present invention is to provide a supporting frame construction which eliminates and disburses road vibrations so that the sheet metal of the tank will not crystallize and crack.

Still another object of the present invention is to provide a milk tank or receptacle of improved design which is not only stronger and more pleasing in appearance but which is also capable of carrying a greater pay load for its weight.

Other objects and advantages of the present invention will become apparent upon perusal of the following description of a preferred embodiment thereof, taken in conjunction with the accompanying drawings, wherein:

Fig. 1 is a plan view of a trailer-tanker embodying the principles of the present invention, with parts cut away to show details in construction.

Fig. 2 is a side elevational view of the trailer-tanker shown in Fig. 1, with parts cut away to show details in construction and with other parts shown in dotted lines.

Fig. 3 is a perspective view of the trailer-tanker shown in Fig. 1, with parts removed.

Fig. 4 is a vertical sectional view taken on the line 4—4 of Fig. 2 showing details in construction.

Fig. 5 is a vertical sectional view taken on the line 5—5 of Fig. 2 showing details in construction.

Fig. 6 is a cross sectional view taken on the line 6—6 of Fig. 2, showing details in construction, slightly enlarged.

Fig. 7 is a cross sectional view taken on the line 7—7 of Fig. 2 showing details in construction, slightly enlarged.

Fig. 8 is a cross-sectional view taken on the line 8—8 of Fig. 2 showing details in construction, slightly enlarged.

Fig. 9 is a front view of the manhole construction shown in Fig. 2, slightly enlarged.

Fig. 10 is a cross-sectional view taken on the line 10—10 of Fig. 9.

Fig. 11 is a view similar to Fig. 10 showing the manhole in full and in its open position.

Referring now to the drawings, a trailer-tanker embodying the principles of the present invention and which is broadly designated by the number 10 comprises generally a supporting axle assembly 11, a receptacle or tank 12, a supporting frame 13, an outside insulating sheet, or jacket 14, and a fifth-wheel plate 15 of any suitable or well-known construction, the fifth-wheel plate being adapted to be draft connected to a suitable propelling means for draft propelling the tanker in a well known manner.

The tank or receptacle 12 is preferably substantially circular in cross section and in the form of a truncated cone positioned with the small diameter end at the rear and the large diameter end at the front. The tank adjacent the forward end thereof is provided with an off-set for receiving the draft means and includes a substantially horizontal floor section 16 and a baffle wall 17, the baffle wall 17 permitting a partial load to be carried in the tank without affecting the riding and tracking characteristics of the tanker to any great extent as will be more fully appreciated hereinafter. The tank is preferably fabricated of stainless steel sheet-metal sections which are cut, formed and welded into the truncated conical shape as previously suggested. Suitable end members 18 and 19 are cut, formed and welded to the opposite ends of the tank so as to provide a fluid-tight receptacle for the transport of milk or any other similar type sanitary liquid. It will be appreciated that the tank is not reinforced from the inside by means of baffles or other structural members such as are employed in reinforcing the tank of a gasoline tanker and that by forming the tank circular in cross section, the tank possesses more inherent strength than that possessed by tanks which are elliptical or oval in cross-section, besides holding more liquid per given amount of metal of the same thickness or gauge.

The tank 12 is carried or cradled in a supporting frame 13 as previously suggested, and this supporting frame 13, as will be more fully appreciated hereinafter, is so constructed as to dissipate and disperse road vibrations and shock throughout the circumferential area of the tank, thereby permitting the tank to be formed of relatively thin sheet metal besides permitting the tank to be carried sufficiently low to effect good riding and tracking characteristics. The frame 13 is of fabricated construction and comprises a backbone or center member 20 which is interconnected with a pair of side members 21 and 22 by means of a plurality of arched ribs 23. Each of the side members 21 and 22 is preferably channel-shaped in cross section and formed of any suitable high tensile strength steel, such as, for example, that identified by the trade name Cor-ten. The backbone member 20 is also preferably channel-shaped in cross section and includes outwardly extending wings or legs 24, and the backbone member 20 and each of the ribs 23 are also preferably formed of high-tensile strength steel such as Cor-ten. In fabricating equipment of this type for attachment to sheets of stainless steel, it is necessary that consideration be given to the electrolytic action which takes place when stainless steel and an unlike metal are interconnected as by welding so that crystallization and cracking of the weldment does not occur. For this reason a pad 25 formed of stainless steel is fixed as by welding to each of the members 21 and 22 and a pad 26 is fixed as by welding to each of the ribs 23. The backbone member 20 is so spaced from the side members 21 and 22 and the ribs 23 are so shaped as to snugly receive therein the tank 12 and the tank 12 is fixed in position as by welding each of the pads 25 and pads 26 as well as the wings 24 of backbone member 20 to the circumferential surface of the tank. A back frame member 27, identical in construction to side frame members 21 and 22, together with an associated stainless steel pad 28, is welded to the end member 18 of tank 12 and to the respective rearward ends of each of the members 21 and 22, and a front frame member 29, also identical in form to frame members 21 and 22 in association with a stainless steel pad 30 fixed thereto is welded to the end member 19 of tank 12 and to the respective forward ends of each of the frame members 21 and 22. The backbone member 20 is preferably positioned in the vertical longitudinal plane of the tank 12 and the side members 21 and 22 are each positioned on opposite sides of the tank 12 and approximately 90° from the backbone member 20.

Rearwardly of the baffle wall 17 a pair of spaced rib members 31, also preferably formed of high tensile strength steel, such as Cor-ten, and welded to suitable steel pads 32, embrace the underside of the tank 12. Each of these rib members 31 is fixed as by welding to the side members 21 and 22 and each of the stainless steel pads 32 is fixed as by welding to the circumferential surface of the tank 12. These underslung rib members, besides aiding in dispersing and dissipating all road shock and vibrations to the adjacent areas of the tank 12, also provide suitable structural means for supporting a weight such as a spare tire and pump housing box as will be more fully appreciated hereinafter, if so desired.

The fifth-wheel plate 15 can be of any suitable or well known construction and has an upwardly inclined leading edge portion 33 in the present instance. The fifth wheel plate has a downwardly depending draft pin 34 for enabling the tanker to be easily and conveniently draft connected to a suitable propelling means in a manner well known in the art. The plate 15 is supported in depending relationship from the side members 21 and 22 so that road shocks and vibrations transmitted to the tank 12 from the fifth wheel plate in operation are dissipated or dispersed throughout the circumferential area of the tank by means of the side members 21 and 22, end members 27 and 29, rib members 23, and backbone member 20, together with their associated stainless steel pads. More specifically, the fifth-wheel plate 15 is connected to each of the side members 21 and 22 by means of a plurality of rigid tubular frame members 35 which are fixed as by welding to the plate 15 and to the respective side frame members 21 and 22. These rigid frame members 35 are spaced sufficiently from the tank 12 so that there is no direct contact between the fifth-wheel plate and the tank.

The supporting axle assembly 11 can be of any suitable or well known construction and includes in the present instance the usual supporting wheels 36 and axle housing 37. A rigid U-shaped axle supporting frame 38 consisting of spaced side members 39 and 40 and a rigid interconnecting member 41 is positioned so as to embrace the lower rearward end of the tank without touching the outside surface thereof. The side member 39 is rigidly connected to the frame member 21 and the side member 40 is rigidly connected to the frame member 22 by rigid interconnecting members 42 which are welded to each of these respective members. Each of the side members 39 and 40 has suitable brackets 43 secured thereto for connection with the opposite ends of suitable springs for supporting the axle assembly 11 from the axle supporting frame 38; however, inasmuch as the axle assembly 11 can be of any suitable or well known construction and inasmuch as the connection of the axle assembly to the axle supporting frame 38 forms no part of the present invention, the details of this construction are not shown.

It will be appreciated that stainless steel will crystallize and crack very rapidly if road vibrations and shock are not dissipated and dispersed over a large area. The frame 13 is based on the principle of the arch with the tank 12 being supported in or cradled in the frame. The backbone member 20 acts as the backbone or key to the arch, and while all road vibrations are directed to the longitudinal side members 21 and 22, they are dispersed to the entire area of the tank by member 20 and the interconnecting rib members 23. The road vibrations are so dispersed therefore that the stainless steel of the tank 12 does not crystallize and consequently crack. The frame 13 is also sufficiently sturdy to carry the tank 12 and the tank 12 can be formed circular in cross section and of relatively light gauge metal so as to increase its pay load as well as increase its inherent strength. The side members 21 and 22 can also be lightened by cutting openings 44 therein so that the frame, besides permitting the tank to be carried so that the undersurface thereof extends into the well formed between the wheels 36 of axle assembly 13 and consequently lowering the center of gravity sufficiently to effect good riding and tracking characteristics for the tanker, is relatively light in weight and therefore permits a bigger pay load to be carried.

The outside jacket 14 is preferably formed of any suitable sheet material such as aluminum or plastic glass and is fabricated in sections which are suitably connected and fixed to the outside surface of the individual members of the supporting frame 13. Insulating material 45 is packed between the outer surface of the tank 12 and the jacket 14 for insulating the tank for well know purposes. Mud fenders 46, also preferably formed of sheet material, such as aluminum or plastic glass, are fixed to opposite sides of jacket 14 for well known purposes and a pump box 47, shown only diagrammatically in dotted lines, Fig. 2, can be positioned adjacent baffle wall 17.

A manhole 48, see Figs. 9, 10 and 11, is formed in tank 12 adjacent baffle wall 17 and is preferably enclosed by pump box housing 47. A pressure type manhole cover 49 is provided for sealing manhole 48 and for permitting easy access into the interior of tank 12 for cleaning purposes. It will be appreciated that the location of manhole 48 adjacent baffle wall 17 permits the operator to have easy access to the interior of the tank without having to climb onto the top of the tank as is the case in present trailer-tanker constructions.

The cover 49 is swingably mounted on the inside of the tank by an interconnected linkage which includes an arm 50 fixed as by welding to tank 12, an arm 51 fixed as by welding to cover 49, and an intermediate arm 52, arm 52 being swingably interconnected to the free ends of arms 50 and 51 for swinging movement about axes 53 and 54. The cover 49 has a peripheral sealing ring 55 fixed thereto, and a sheet metal ring 56 is welded to the sheet metal of tank 12 so as to define manhole 48. The outside surface of cover 49 has fixed thereto a pair of spaced mounting ears 57 and a threaded T-shaped member 58 is swingably carried between ears 57 by a suitable pin 59. A takeup bar 60 is slidably and rotatably received by member 58 and is notched adjacent its opposite ends as at 61 for receiving the outside edge of ring 56. A nut 61a is threadedly received by member 58 and is provided with a pair of oppositely extending turning handles 62 for permitting the operator to easily turn the nut on member 58. In operation the nut 61 can be drawn on member 58 sufficiently to move the cover 49 in sealing relationship against the inside edge of the plate 56, the takeup bar 60 being positioned so as to bridge manhole 48 and engage ring 56 and be forced against the outside edge of ring 56 with a force equal to the force urging the cover in a sealing direction. To open the cover 49, nut 61a is backed off member 58 sufficiently to permit the takeup bar 60 to be turned out of its engaging position with ring 56. The cover is then free to be swung open, and because of the convenient location of the manhole 48 the interior of tank 12 can be readily cleaned. A lock ring or clasp 63 is swingably received by takeup bar 60 and positioned to receive one of the handles 62 upon being swung downwardly and upon the nut 61 being turned so as to locate the handles in substantially vertical positions. It will be appreciated, therefore, that lock ring 63 is effective for preventing road vibrations from urging the nut 61a to turn in its unlocking direction.

A suitable pressure pump, not shown and forming no part of the present invention, is carried in the pump box for filling or emptying the tank and an air vent 64 is provided on the top of the tank for well known purposes. A drainpipe 65 is provided adjacent the baffle wall 17 for permitting all of the liquid in the tank to be drained therefrom, and a parking wheel assembly 66 of any suitable or well known construction is located adjacent the front of the tanker for well known purposes.

While the tanker construction shown and described is of the two-wheel type intended to be carried and supported in draft relationship with a suitable propelling vehicle of well known type, it will be appreciated that the principles of the present invention can be embodied in a tanker construction which is movably supported on a pair of spaced axle assemblies and which is adaptably connected with a tandem to the tanker of the type shown and described. It will also be appreciated that the fifth wheel plate 15 can also be attached to a wheeled dolly 66 and that a trailer-tanker of this type can be draft connected to a draft hitch 67 for connecting two trailer-tankers in tandem.

It will be appreciated, therefore, that the unique construction of frame 13 permits the tank to be carried so that the under portion thereof extends into the well formed between the supporting wheels and that road shocks and vibrations transmitted to the supporting frame are dispersed and dissipated to substantially the entire area of the tank so as to prevent crystallization or cracking of same. It will also be appreciated that the frame 13 permits the utilization of a tank which is substantially circular in cross section, which is capable of carrying a greater pay load than hereinbefore possible, which is capable of being formed of relatively light gauge sheet metal, and which is supported sufficiently low to effect good riding and tracking characteristics. It will be further appreciated that the manhole is located at the side of the tank where the manhole cover is more readily accessible and where the operator can more conveniently clean the interior of the tank. Besides these mechanical advantages and features gained by utilization of the teachings of the present invention, it will also be appreciated that the trailer-tanker is more pleasing in appearance, easier to maintain, and easier to drive.

What is claimed is:

1. A trailer frame comprising a pair of horizontally spaced longitudinally extending rigid side members, a longitudinally extending backbone member positioned between said side members and vertically disposed with respect thereto, a plurality of rib members extending from opposite sides of said backbone member and interconnecting each of said side members with said backbone member whereby a vertical force exerted against said side members will be directed against said backbone member as a substantially horizontal thrust, and an axle assembly including supporting wheels carried by said side members for movably supporting said frame, road shocks and vibrations transmitted to said side members being transmitted to said backbone member by each of said rib members.

2. A trailer frame comprising a pair of horizontally spaced longitudinally extending rigid side members, a longitudinally extending backbone member positioned between said side members and upwardly disposed with respect thereto, a plurality of rib members extending from opposite sides of said backbone member and interconnecting each of said side members with said backbone member whereby a vertical force exerted against said side members will be directed against said backbone member as a substantially horizontal thrust, and an axle assembly including supporting wheels carried by said side members for movably supporting said frame, road shocks and vibrations transmitted to said side members being transmitted to said backbone member by each of said rib members.

3. A trailer-tanker comprising a pair of horizontally spaced longitudinally extending rigid side members and a longitudinally extending rigid backbone member positioned between said side members and vertically disposed with respect thereto, a plurality of ribs extending from opposite sides of said backbone member and interconnecting each of said side members thereto whereby a vertical force exerted against said side members will be transmitted to said backbone member in the form of a substantially horizontal thrust, a longitudinally disposed tank secured to said backbone member, said side members and said ribs, approximately half of the cross sectional area of said tank being received by said side members, said backbone member and said ribs, supporting wheels carried by said side members, the undersurface of said tank being disposed in the well formed between said supporting wheels whereby the center of gravity of said trailer is sufficiently low to effect good trailing and tracking characteristics, all road shocks and vibrations transmitted to said side members being transmitted to said backbone member and said connecting ribs.

4. A trailer-tanker comprising a pair of horizontally spaced longitudinally extending rigid side members and a longitudinally extending rigid backbone member positioned between said side members and upwardly disposed with respect thereto, a plurality of ribs extending from opposite sides of said backbone member and interconnecting each of said side members thereto, the plane of said side members, said backbone member and said interconnecting ribs being substantially semi-circular in cross-section, a longitudinally disposed tank substantially circular in cross section secured to said backbone member, said side members and said ribs, supporting wheels carried by said side members, the undersurface of said tank being disposed in the well formed between said supporting wheels whereby all road shocks and vibrations transmitted to said side members are transmitted to said backbone member by said connecting ribs in the form of a substantially horizontal thrust.

5. A trailer-tanker having a frame comprising a centrally disposed longitudinally extending rigid member, substantially longitudinally extending rigid side members positioned on opposite sides of and vertically disposed with respect to said centrally disposed member and rigidly interconnected therewith, a longitudinally disposed tank received in said frame and secured to said centrally disposed member and said side members, substantially half of the cross sectional area of said tank being received between said side and centrally disposed members, supporting wheels secured to said side members adjacent one end thereof for movably supporting said frame, and a fifth wheel plate fixed with said side members adjacent the other end thereof for draft connecting said tank frame to a suitable propelling means, all road shocks and vibrations transmitted to said side members being dispersed throughout the area of said tank and as a substantially horizontal thrust against said centrally disposed member.

6. A trailer-tanker having a frame comprising a centrally disposed longitudinally extending rigid member, substantially longitudinally extending rigid side members positioned on opposite sides of and downwardly disposed with respect to said centrally disposed member and rigidly interconnected therewith, a longitudinally extending tank received in said frame and secured to said centrally disposed member and said side members, the cross sectional shape of the plane of said frame substantially corresponding to the cross sectional shape of substantially the upper half of said tank, an axle assembly including supporting wheels secured to said side members adjacent one end thereof for movably supporting said frame, the undersurface of said tank adjacent said wheels bing disposed in the well formed between said supporting wheels, and a horizontally disposed fifth wheel plate depending from said side members adjacent the other ends thereof for draft connection with a propelling means, all road shocks and vibrations transmitted to said side members being dispersed throughout the area of the tank and as a substantially horizontal thrust against said centrally disposed member.

7. A trailer-tanker having a frame comprising a centrally disposed longitudinally extending rigid member, substantially longitudinally extending rigid side members on opposite sides of and downwardly disposed with respect to said centrally disposed member and rigidly interconnected therewith, a tank disposed longitudinally in said frame and secured to said centrally disposed member and said side members, an axle assembly including supporting wheels secured to said side members adjacent one end thereof for movably supporting said frame, said tank being substantially circular in cross section and having an offset formed adjacent one end thereof comprising a horizontally disposed section adjacent said side members and a downwardly disposed baffle section connecting said horizontally disposed section with the undersurface of said tank, the undersurface of said tank adjacent said supporting wheels being disposed in the well formed between said supporting wheels, and a fifth-wheel plate secured to said side members adjacent the other end thereof and positioned in said offset for permitting said trailer to be draft connected to a propelling means, the diameter of said tank adjacent said supporting wheels being less than the diameter of said tank adjacent said fifth wheel, all road shocks and vibrations transmitted to said side members being dispersed throughout the area of the tank and as a substantially horizontal thrust against said centrally disposed member.

8. A trailer-tanker having a frame comprising a plurality of substantially longitudinally extending rigid members interconnected so that the plane thereof in cross section is substantially semicircular in shape, a longitudinally disposed tank cradled in said frame and fixed to said rigid members, and an axle assembly having supporting wheels carried by said rigid members and positioned so that the undersurface of said tank is disposed in the well formed between said supporting wheels, road shocks and vibrations transmitted to said frame by said axle assembly in the form of a vertical force being dispersed throughout said frame in the form of horizontal and diagonal thrust.

9. A trailer-tanker having a longitudinally disposed tank substantially circular in cross section, rigid side members fixed to opposite sides of said tank and extending substantially the entire length thereof, a backbone member fixed to the top of said tank and extending substantially the entire length of said tank, rib members rigidly interconnecting each of said side members to said backbone member and shaped to conform to the curvature of said tank and fixed thereto, and supporting wheels carried by said members for movably supporting said trailer-tanker, road shocks and vibrations transmitted to said side members being directed against said backbone member as a substantially horizontal thrust.

10. A trailer-tanker having a frame comprising a centrally disposed longitudinally extending rigid member, substantially longitudinally extending rigid side members on opposite sides of and downwardly disposed with respect to said centrally disposed member and rigidly interconnected therewith, a tank disposed longitudinally in said frame and secured to said centrally disposed member and said side members, an axle assembly including supporting wheels secured to said side members adjacent one end thereof for movably supporting said frame, said tank being substantially circular in cross section and having an offset formed adjacent one end thereof comprising a horizontally disposed section adjacent said side members and a downwardly disposed baffle section connecting said horizontally disposed section with the undersurface of said tank, the undersurface of said tank adjacent said supporting wheels being disposed in the well formed between said supporting wheels, said tank having a manhole formed adjacent said baffle wall, a pressure-type manhole cover for sealing said manhole, and a fifth wheel plate secured to said side members adjacent the other end thereof and positioned in said offset for permitting said trailer to be draft connected to a propelling means, the diameter of said tank adjacent said supporting wheels being less than the diameter of said tank adjacent said fifth wheel, all road shocks and vibrations transmitted to said side members being directed against said centrally disposed member as a substantially horizontal thrust.

References Cited in the file of this patent

UNITED STATES PATENTS

| Number | Name | Date |
|---|---|---|
| 574,420 | Heiser | Jan. 5, 1897 |
| 1,908,684 | Buchanan | May 16, 1933 |
| 2,067,993 | Thwaits | Jan. 19, 1937 |
| 2,160,477 | Kramer | May 30, 1939 |
| 2,239,442 | Gredell | Apr. 22, 1941 |
| 2,271,411 | Thwaits | Jan. 27, 1942 |
| 2,362,657 | Meyer | Nov. 14, 1944 |
| 2,513,636 | Fulton | July 4, 1950 |
| 2,657,823 | Skinner | Nov. 3, 1953 |
| 2,714,516 | Brown | Aug. 2, 1955 |